(12) United States Patent
Ptasinski et al.

(10) Patent No.: US 8,473,732 B2
(45) Date of Patent: Jun. 25, 2013

(54) METHOD AND SYSTEM FOR SECURE BLOCK ACKNOWLEDGMENT (BLOCK ACK) WITH PROTECTED MAC SEQUENCE NUMBER

(75) Inventors: Henry Ptasinski, San Francisco, CA (US); Matthew Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 449 days.

(21) Appl. No.: 12/405,354

(22) Filed: Mar. 17, 2009

(65) Prior Publication Data

US 2009/0235066 A1 Sep. 17, 2009

Related U.S. Application Data

(60) Provisional application No. 61/037,222, filed on Mar. 17, 2008.

(51) Int. Cl.
*G06F 21/00* (2006.01)
(52) U.S. Cl.
USPC ........................................................ 713/150
(58) Field of Classification Search
USPC ................................................. 713/150–152
See application file for complete search history.

(56) References Cited

U.S. PATENT DOCUMENTS

| | | | | |
|---|---|---|---|---|
| 7,236,455 B1 * | 6/2007 | Proudler et al. | ............... | 370/230 |
| 2002/0143980 A1 * | 10/2002 | Wetherall et al. | ............. | 709/232 |
| 2003/0023915 A1 * | 1/2003 | Choi | .............................. | 714/748 |
| 2006/0067526 A1 * | 3/2006 | Faccin et al. | .................... | 380/46 |
| 2007/0104203 A1 * | 5/2007 | Sood et al. | ..................... | 370/394 |
| 2007/0253554 A1 * | 11/2007 | Chesson et al. | ............... | 380/273 |
| 2009/0019537 A1 * | 1/2009 | Stavrou et al. | ................... | 726/13 |
| 2009/0041252 A1 * | 2/2009 | Hanna | ........................... | 380/278 |

OTHER PUBLICATIONS

IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, IEEE Computer Society, IEEE Std. 802.11-2007 (Revision of IEEE Std. 802.11-1999), Jun. 12, 2007, pp. 59-71, 79-86 123-128, 155-185, and 302-306.
Wi-fi Protected Access (WPA) Enhanced Security Implementation Based on IEEE P802.11i Standard, Version 3.1, Aug. 2004.
International Search Report and Written Opinion corresponding to International Patent Application Serial No. PCT/US2009/37350, mailed Apr. 23, 2009.
International Search Report and Written Opinion for International Patent Application No. PCT/US2009/037350, mailed Sep. 30, 2010.

* cited by examiner

*Primary Examiner* — Philip Chea
*Assistant Examiner* — Kendall Dolly
(74) *Attorney, Agent, or Firm* — Garlick & Markison; Holly L. Rudnick

(57) ABSTRACT

Aspects of a method and system for protected MAC sequence numbers, as well as secure block acknowledgment (block ACK) with protected MAC sequence number are presented. In one aspect of the system a communicating station (STA) may protect the sequence number (SN) field portion of transmitted protocol data units (PDUs), for example data MAC layer PDUs (MPDUs), or frames. In another aspect of the system, starting sequence number (SSN) information communicated via control frames, such as block acknowledgment request (BAR) and block acknowledgment (BA) frames, may be protected. In another aspect of the system, communicating STAs may exchange management frames to enable the protection of SN information in data MPDUs and/or the protection of SSN values in control MPDUs.

20 Claims, 7 Drawing Sheets

METHOD AND SYSTEM FOR SECURE BLOCK ACKNOWLEDGMENT (BLOCK ACK) WITH PROTECTED MAC SEQUENCE NUMBER

CROSS-REFERENCE TO RELATED APPLICATIONS/INCORPORATION BY REFERENCE

This application makes reference to, claims priority to, and claims the benefit of U.S. Provisional Application Ser. No. 61/037,222 filed Mar. 17, 2008, which is hereby incorporated herein by reference in its entirety.

FIELD OF THE INVENTION

Certain embodiments of the invention relate to communication networks. More specifically, certain embodiments of the invention relate to a method and system for secure block acknowledgment (block ACK) with protected MAC sequence number.

BACKGROUND OF THE INVENTION

IEEE 802.11 describes a communication architecture, which may enable computing devices to communicate via wireless local area networks (WLANs). One of the building blocks for the WLAN is the basic service set (BSS). A BSS may comprise a plurality of computing devices, or stations (STA), which may communicate wirelessly via one or more RF channels within an RF coverage area. The span of an RF coverage area may be determined based on the distance over which a source STA may transmit data via an RF channel, which may be received by a destination STA.

IEEE 802.11 comprises a variety of security methods. These methods include wired equivalent privacy (WEP), the temporal key integrity protocol (TKIP), counter mode with cipher-block chaining message authentication code (CBC-MAC) protocol (CCMP), IEEE 802.1X and robust secure network association (RSNA) algorithms. The various security methods may be utilized to enable secure communications between STAs. An exemplary method for secure communications may utilize encryption of data transmitted between a source STA and a destination STA to prevent a user at a eavesdropping STA from gaining access to the unencrypted (also referred to as "clear text" or "plaintext") data. Within the context of the medium access control (MAC) protocol layer of IEEE 802.11, the data may be referred to as MAC layer service data unit (MSDU) data. The data may be communicated within the frame body (or payload) field within protocol data units (PDUs) referred to as data frames. Within the context of the MAC protocol layer of IEEE 802.11, the frame may be referred to as a MAC layer protocol data unit (MPDU). Each data frame may also comprise a sequence number (SN) field.

An exemplary method for secure communications involves the computation of a message integrity code (MIC). The MIC may be computed based on MSDU plaintext data, the MSDU source address (SA) field, the MSDU destination address (DA) field, and the MSDU priority field. The MIC may alternatively be computed based on MPDU plaintext data, the MPDU header including address fields, priority field, and other components of the MPDU header. A reserved field may also be included in the MIC computation. The MIC is appended to the plaintext data to form an extended data field. The extended data field may also comprise a pad field. The extended data field may be encrypted to generate an MPDU frame body field. The data MPDU, with encrypted frame body field, may be transmitted from a source STA to a destination STA in a secure communication link. Data, which is transmitted in this fashion, may be referred to as "protected data". The destination STA may send an acknowledgment (ACK) to the source STA to confirm successful receipt of the MPDU. An ACK is referred to as a control frame.

IEEE 802.11 supports a block ACK (BA) capability. The BA capability enables a source STA to transmit a plurality of sequence numbered frames during a communication session while receiving a single BA from the destination STA, which indicates successful reception of any number of frames from within a sequentially numbered block of frames. The BA capability is established between a source STA and a destination STA through an exchange of frames referred to as management frames. For example, in a typical exchange of management frames, the source STA may transmit an ADDBA request management frame to the destination STA. The destination STA may transmit an ACK frame to the source STA to acknowledge receipt of the ADDBA request frame. The destination STA may subsequently transmit an ADDBA response frame to the source STA. The source STA may transmit an ACK frame to the destination STA to acknowledge receipt of the ADDBA response frame.

The exchange of management frames between the source STA and the destination STA identifies the data frames, which are to be the subject of block acknowledgment based on a (SA,DA,TID) tuple, where TID refers to a traffic identifier value. Each transmitted data frame, which is to be the subject of BA may comprise the TID value within the TID field within the frame. The TID value may be determined during the exchange of management frames.

During the communication session identified by the (SA, DA,TID) tuple, the source STA and the destination STA may each maintain state information related to the communication. The state information may be represented as a scorecard. The source STA (TX) scorecard may comprise a TX scorecard left edge (LE) pointer, a TX scorecard right edge (RE) pointer and a TX scorecard size parameter. When a current window is first established:

$$TX(\text{size}) = TX(RE) - TX(LE_{init}) + 1$$

where TX(RE) refers to the TX scorecard RE pointer value, $TX(LE_{init})$ refers to the initial TX scorecard LE pointer value, and TX(size) refers to the TX scorecard size parameter value. The TX(size) represents a transmit window size, typically measured in frames, which corresponds to the maximum number of frames that a source STA may transmit without receiving an ACK. The $TX(LE_{init})$ value represents the lowest number SN value for a transmitted data frame within the transmit window. As the source STA receives acknowledgment of previously transmitted frames within the transmit window, the TX scorecard LE pointer may reflect a current LE pointer value $TX(LE_{cur})$, which represents the lowest numbered SN value within the transmit window for which an ACK has not been received. At any given time, the source STA may transmit frames for which the SN value is within the range:

$$TX(LE_{cur}) \leq SN < TX(LE_{cur}) + TX(\text{size})$$

where:

$$TX(RE) = TX(LE_{cur}) + TX(\text{size}) - 1$$

The source STA may also accept ACK frames, which acknowledge receipt of transmitted frames within the transmit window.

The destination STA (RX) scorecard may comprise an RX scorecard LE pointer, an RX scorecard RE pointer, an RX buffer window LE pointer, an RX buffer window RE pointer and an RX window size parameter.

Received frames may initially be stored in the RX buffer. At the destination STA, the MAC layer protocol entity may extract the payload field portion from received frames, which may be passed to a higher layer protocol entity (for example, a network layer protocol entity). Prior to passing the payload to the higher layer protocol entity, the MAC layer protocol entity may decrypt the payload field portion. The RX buffer window LE pointer value minus one, $RX_{buf}(LE)-1$, represents the highest SN value for a received frame for which the payload portion has been passed to a higher layer protocol entity. Based on the value $RX_{buf}(LE)$, an RX buffer window RE pointer value, $RX_{buf}(RE)$, may be determined:

$$RX_{buf}(RE)=RX_{buf}(LE)+RX(size)-1$$

where RX(size) refers to the RX window size parameter value. The RX(size) represents a receive window size, typically measured in frames, which corresponds to the maximum number of frames that a destination STA may store within a receive buffer. At any given time, the destination STA may normally receive frames for which the SN value is within the range:

$$RX_{buf}(LE) \leq SN < RX_{buf}(RE)$$

Frames received from the source STA for which $SN<RX_{buf}(LE)$ may be discarded at the destination STA.

The destination STA may adjust the $RX_{buf}(LE)$ in response to receipt of a control frame from the source STA. For example, an initial $RX_{buf}(LE_{init})$ value may be established at a destination STA based upon receipt of a control frame from the source STA. For example, the source STA may transmit a block acknowledgment request (BAR) control frame to the destination STA. The BAR frame may comprise a starting sequence number (SSN) value. The destination STA may utilize the SSN value in the received BAR control frame to establish the value $RX_{buf}(LE_{init})$:

$$RX_{buf}(LE_{init})=SSN$$

An initial RX scorecard LE pointer value $RX_{sc}(LE_{init})$ may also be established based on the received SSN value:

$$RX_{sc}(LE_{init})=SSN$$

Normally, the MAC layer passes payload portions of received frames to a higher protocol entity when the received frames comprise a contiguous block of sequentially numbered frames. However, if there were any previously buffered frames associated with the (SA,DA,TID) communication session at the time that the BAR frame is received for which SN<SSN, the payload portions of the previously buffered frames may be passed to the higher layer protocol entity even if there are gaps in the sequence numbering among the previously stored frames. This may result in discard of the payload portions for some or all of the previously buffered frames at the higher layer protocol entity.

The destination STA may respond to receipt of the BAR control frame by transmitting a block acknowledgment (BA) control frame to the source STA. The BA control frame may comprise a bitmap field. The bitmap field may indicate whether the destination STA has successfully received any among a block of transmitted data frames from the source STA for data frame sequence number values SN≧SSN. For example, the first position in the bitmap may correspond to a frame with a sequence number value SN=SSN. A bit value=0 may indicate that a frame with the corresponding SN value has not been received by the destination STA. For example, a successful receipt of a frame received with a given SN value is indicated by a bit value=1 for a corresponding bit position in the bit map.

The destination STA may also adjust the $RX_{buf}(LE)$ value in response to receipt of a data frame from the source STA. For example, when the destination STA receives a data frame for which $SN_{rec}>RX_{buf}(RE)$, an updated RX buffer window RE pointer value, $RX_{buf}^{upd}(RE)$, may be established:

$$RX_{buf}^{upd}(RE)=SN_{rec}$$

Based on the updated $RX_{buf}^{upd}(RE)$ value, an updated RX buffer window LE pointer value, $RX_{buf}^{upd}(LE)$, may be established:

$$RX_{buf}^{upd}(LE)=RX_{buf}^{upd}(RE)-RX(size)+1$$

If there were any currently buffered data frames for which $SN<RX_{buf}^{upd}(LE)$, the payload portions of those currently buffered frames may be passed to the higher layer protocol entity even if there are gaps in the sequence numbering among the currently stored frames. This may result in discard of the payload portions for some or all of those currently buffered frames at the higher layer protocol entity.

A destination STA may send a BA control frame to the source STA in response to an explicit request from the source STA or in response to an implicit request from the source STA. An example of an explicit request is a BAR control frame. An example of an implicit request is a data frame, which comprises an indication that a BA is requested from the destination STA by the source STA. The destination STA may report successful receipt of some data frames in the BA control frame, while indicating that other data frames have not been received. In response to an implicit BA request, the $RX_{buf}(LE)$ value may not change if the lowest SN numbered frame in the bitmap field of the BA frame has not been successfully received. For example, the first bit in the bitmap field of the BA frame may indicate whether the lowest SN numbered frame has been successfully received. The sequence number for the lowest SN numbered frame may be indicated in the SSN field within the transmitted BA frame. Regardless of whether the destination STA sends a BA control frame in response to an explicit request from the source STA, or in response to an implicit request, the source STA, which receives the BA control frame, may utilize the SSN field value and the bitmap field values to adjust one or more TX scorecard pointer values.

For a destination STA, which utilizes persistent RX scorecard maintenance, RX scorecard information is maintained after transmission of a BA frame. Thus, each subsequent BA frame transmitted for a given receive window reflects the history of successful data frame receipts within the receive window. Consequently, for a destination STA, which utilizes persistent RX scorecard maintenance, $RX_{sc}(LE)=RX_{buf}(LE)$.

For a destination STA, which utilizes dynamic RX scorecard maintenance, RX scorecard information is not maintained after a BA frame has been transmitted. In this regard, the destination STA "forgets" that a data frame has been successfully received once the receipt of the data frame has been acknowledged via a transmitted BA frame. For a destination STA, which utilizes dynamic RX scorecard maintenance the $RX_{sc}(LE)$ scorecard value is updated for each currently received data frame:

$$RX_{sc}(LE)=SN_{rec}-RX(size)+1$$

where $SN_{rec}$ represents the sequence number for a currently received data frame.

In current IEEE 802.11 security methods, the sequence number field in transmitted data frames is not protected. Furthermore, transmitted control frames, such as BAR control frames and BA control frames, are also not protected.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for secure block acknowledgment (block ACK) with protected MAC sequence number, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for secure block acknowledgment (block ACK) with protected MAC sequence number. Various embodiments of the invention comprise a method and system by which a STA may protect the sequence number (SN) field portion of transmitted protocol data units (PDUs), for example data MAC layer PDUs (MPDUs), or frames. The method and system described herein may also be utilized to realize embodiments of the invention in which starting sequence number (SSN) information communicated via control frames, such as block acknowledgment request (BAR) and block acknowledgment (BA) frames, may be protected. Various embodiments of the invention may also comprise a method and system by which communicating STAs may exchange management frames to enable the protection of SN information in data MPDUs and/or the protection of SSN in control MPDUs.

Figure 1:
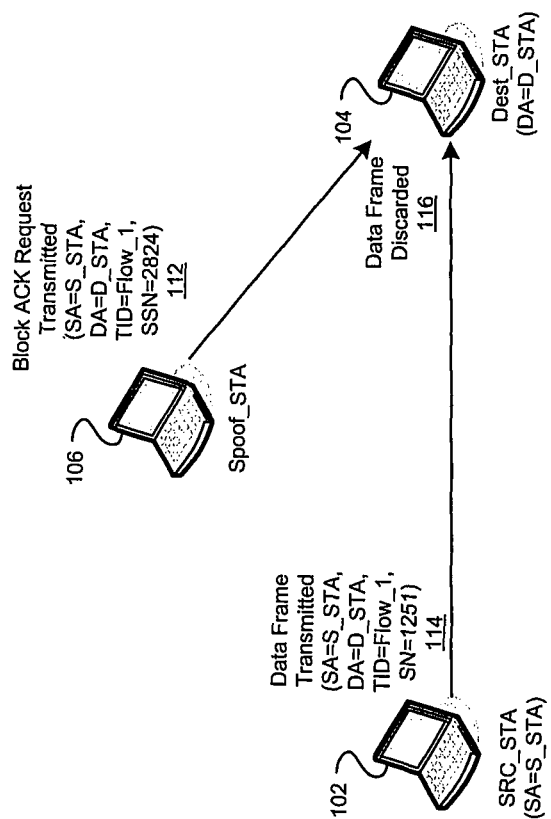
FIG. 1 is a diagram of an exemplary system for an exemplary denial of service attack, which may be utilized in connection with in an embodiment of the invention.

FIG. 1 is a diagram of an exemplary system for an exemplary denial of service attack, which may be utilized in connection with in an embodiment of the invention. Referring to FIG. 1, there is shown an exemplary source station (src_STA) 102, an exemplary destination station (dest_STA) 104 and a spoofing station (spoof_STA) 106. The src_STA 102 may be identified by a source address (SA), S_STA and the d_STA 104 may be identified by a destination address (DA), D_STA.

In FIG. 1, the src_STA 102 and the dest_STA 104 may be engaged in a communication session, which is associated with a traffic identifier (TID), Flow_1. The TID value may be determined by the src_STA 102 and the dest_STA 104 during an exchange of management frames. The communication session between src_STA 102 and dest_STA 104 may be identified by a tuple (S_STA,D_STA,Flow_1). The payload portions of data frames transmitted during the communication session (S_STA,D_STA,Flow_1) may be protected by utilizing various security methods. However, the spoof_STA 106 may monitor the communication (S_STA,D_STA, Flow_1) and is able to determine the SA for scr_STA 102, the DA for dest_STA 104, the TID for the communication session (S_STA,D_STA,Flow_1) and the SN for data frames communicated during the communication session (S_STA, D_STA,Flow_1). While the spoof_STA 106 may be unable to decrypt the payload portions of the data frames communicated during the communication session (S_STA,D_STA, Flow_1), the spoof_STA 106 may send a forged block ACK request (BAR) control frame 112 to the dest_STA 104. The BAR control frame 112 may comprise values: SA=S_STA, DA=D_STA, TID=Flow_1 and SSN=2824.

Based on the forged BAR control frame 112, the dest_STA 104 may adjust one or more RX scorecard values. For example, the dest_STA 104 may adjust an RX scorecard left edge (LE) pointer value and/or an RX buffer window LE pointer value based on the SSN value contained within the forged BAR control frame 112. Based on the adjusted RX scorecard LE pointer value and/or RX buffer window LE pointer value, the dest_STA 104 may reject a subsequent data frame 114, which is transmitted by the src_STA 102, which comprises an SN=1251 value.

As shown by the example illustrated in FIG. 1, even though the spoof_STA 106 may be unable to detect the plaintext data transmitted within data frames during the communication session (S_STA,D_STA,Flow_1), the spoof_STA 106 may be able to interrupt the communication session (S_STA,D_STA,Flow_1) between the src_STA 102 and the dest_STA 104 by prompting the dest_STA 104 to discard data frames transmitted by the src_STA 102. The behavior exemplified by the spoof STA 106 in FIG. 1 is referred to as a denial of service (DoS) attack.

Alternatively, the spoof_STA 106 may achieve a successful DoS attack by transmitting a forged data frame, comprising values: SA=S_STA, DA=D_STA, TID=Flow_1 and SSN=2824. Upon receipt by the dest_STA 104 of the forged data frame, the dest_STA 104 may adjust an RX buffer window right edge (RE) pointer value and/or RX scorecard RE pointer value. In turn, the dest_STA 104 may adjust the RX buffer LE pointer value and/or the RX scorecard LE pointer value. Assuming a receive window size value of, for example, 64 frames, the dest_STA 104 may discard transmitted data frame 114 from the src_STA 102.

In another aspect of the DoS attack, the spoof_STA 106 may transmit a forged data frame, which comprises a SN=1279 value. In this instance, the MAC layer protocol entity within the dest_STA 104 may not discard the transmitted data frame 114. However, the corresponding adjustment of RX scorecard values and/or RX buffer values in response to receipt of the forged data frame may result in the payload portion of the received data frame 114 being passed to the higher layer protocol entity in an incorrect sequence order relative to other payload portions that are passed to the higher layer protocol entity. During decryption of the payload portion of the received data frame 114, an error may be detected by the security methods utilized during the communication session (S_STA,D_STA,Flow_1). For example, during the decryption of the payload portion of the received data frame 114, a packet number (PN) value may be computed. By utilizing the various security methods, the dest_STA 104 may determine that storage of the received data frame 114 within a receive buffer at the dest_STA 104 has resulted in the payload portion of the data frame 114 being passed to the higher layer protocol entity in an incorrect sequence order relative to other buffered payload portions. The out of sequence delivery of payload data to the higher layer protocol entity may result in erroneous processing of received data by the higher layer protocol entity. The erroneous processing may, for example, result in a loss of data.

Figure 2:
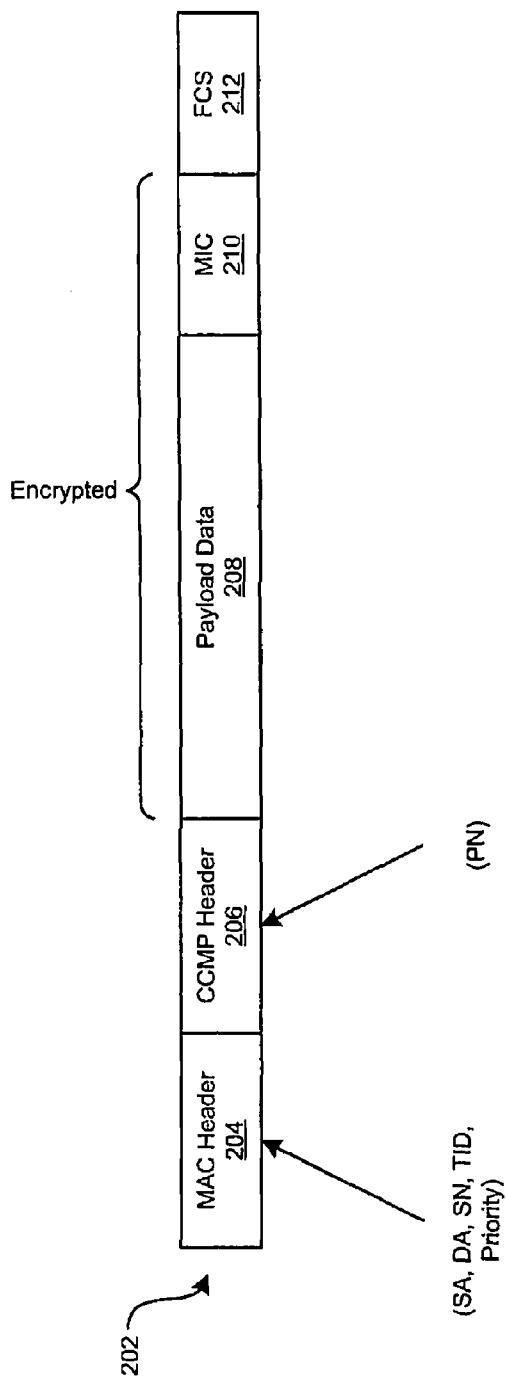
FIG. 2 is an exemplary MAC layer protocol data unit, which may be utilized in connection with an embodiment of the invention.

FIG. 2 is an exemplary MAC layer protocol data unit, which may be utilized in connection with an embodiment of the invention. Referring to FIG. 2, there is shown an exemplary MPDU 202. The exemplary MPDU 202 may be generated in connection with IEEE 802.11 standards, CCMP security methods and/or Wi-Fi protected access (WPA) security methods. The exemplary MPDU 202 comprises a MAC header field 204, a CCMP header field 206, a payload data field 208, a MIC field 210 and a frame check sequence (FCS) field 212. In a general MPDU format as specified in IEEE 802.11 standards, the combined payload data field 208 and MIC field 210 may correspond to the frame body field. The exemplary MAC header field 204 comprises SA, DA, SN, TID and additional fields as specified in IEEE 802.11 standards. The exemplary CCMP header field 206 comprises a packet number (PN) field as specified in IEEE 802.11 standards. The payload data field 208 may correspond to plaintext data that corresponds to a MAC layer service data unit (MSDU). The MIC field 210 corresponds to the message integrity check field. The plaintext version of the payload data field 208 and the MIC field 210 may be encrypted based on CCMP security methods. The encrypted version of the payload data 208 and the MIC 210 fields may be transmitted via the MPDU 202.

The encrypted version of the payload data 208 and MIC 210 fields may be generated based on the PN value. With existing security methods, the payload data field 208 may be protected for transmitted MPDUs 202, but the SN field is not protected. In various embodiments of the invention, the SN protection may be achieved by utilizing the SN value to generate the PN value. As a consequence, the encrypted version of the payload data 208 and MIC 210 fields may be generated based on at least the SN value. In this manner, the SN field may be protected.

Figure 3:
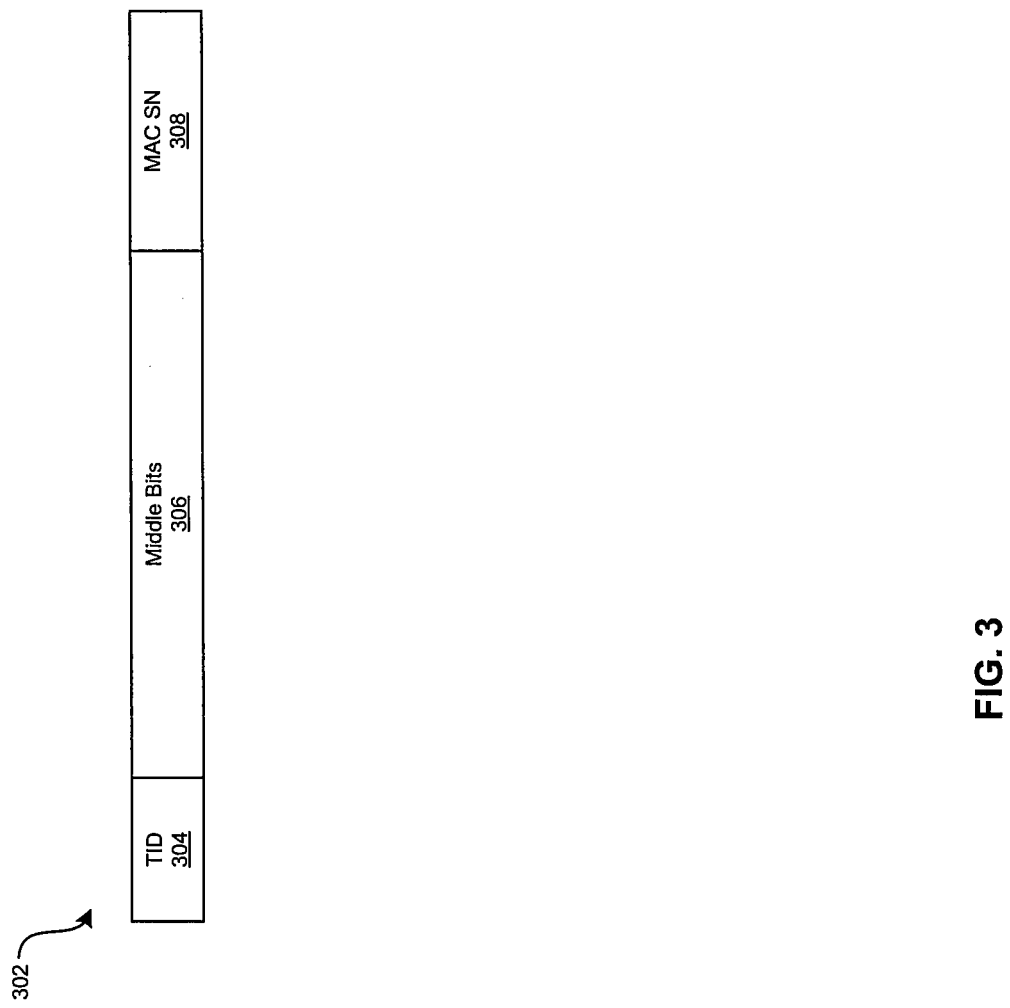
FIG. 3 is a diagram of an exemplary packet number format, in accordance with an embodiment of the invention.

FIG. 3 is a diagram of an exemplary packet number format, in accordance with an embodiment of the invention. Referring to FIG. 3, there is shown a packet number (PN) format 302. The PN format 302 comprises a TID field 304, a middle bits field 306 and a MAC SN field 308. The TID field 304 corresponds to the TID field within the MAC header 204. In an exemplary embodiment of the invention, the TID field 304 comprises 4 bits. The MAC SN field 308 corresponds to the SN field within the MAC header 204. In an exemplary embodiment of the invention, the MAC SN field 308 comprises 12 bits.

In an exemplary embodiment of the invention, the middle bits field 306 comprises 32 bits. The value for the middle bits field 306 may be determined based on the MAC SN field 308. In this regard, the middle bits field 306 may be utilized as extension bits for the MAC SN field 308. For example, the value for the middle bits field 306 may increment by 1 each time the MAC SN field value 308 exceeds 4,095. The value for the TID field 304 may be determined based on an exchange of management frames when the block acknowledgment capability is negotiated between the source STA and the destination STA.

An exemplary embodiment of the invention may enable generation of $2^{44}$ unique PN values. In addition to the PN value, the encrypted version of the payload data 208 and MIC 210 fields may be based on a temporal key (key) value. In an exemplary embodiment of the invention, the key may comprise 128 bits. When the set of unique PN values has been exhausted during a communication session, for example, when a subsequent PN value will be equal to a previous PN value during the communication session, a new key value may be generated. The new key value may subsequently be used at the start of a repetition of the PN value sequence.

In various embodiments of the invention, the PN format 302 may be utilized within the CCMP header field 206. The encrypted version of the payload data 208 and MIC 210 fields may be computed based on: the key; a frame body (comprising the payload data 208 field and the MIC 210 field); a nonce; and additional authentication data (MD). In an exemplary embodiment of the invention, the MD is generated based on fields contained within the MAC header field. In various embodiments of the invention, generation of the MD may be unchanged in comparison to existing security methods. The nonce may be generated based on the PN 302, the DA field value and the priority field value (from the MAC header 204 field).

The security methods may be enabled between a source STA and a destination STA based on an exchange of management frames, which establishes an association between the source STA and the destination STA. Exemplary management frames for association include beacon frames, association request frames and association response frames, for example. The security methods may be utilized in connection with robust security network association (RSNA). Management frames, which enable RSNA may comprise an RSN information element (IE). The RSN IE may identify the security methods that are enabled for secure communication between the source STA and the destination STA. The RSN IE may comprise an RSN capabilities field.

Figure 4:
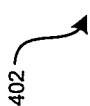
FIG. 4 is a diagram of an exemplary robust security network capabilities field, in accordance with an embodiment of the invention.

In various embodiments of the invention, SN protection may be enabled during the exchange of management frames based on a modified RSN capabilities field. FIG. 4 is a diagram of an exemplary robust security network capabilities field, in accordance with an embodiment of the invention. Referring to FIG. 4, there is shown an exemplary RSN capabilities field 402. The RSN capabilities field 402 may comprise a pre-authentication (pre-auth) field 404, a no pairwise field 406, a pairwise transient key security association (PTKSA) replay counters field 408, a group temporal key security association (GTKSA) replay counters field 410, reserved fields 412, 416, 420, a peerkey enabled field 414 and a protected SN field 418.

The pre-auth field 404, no pairwise field 406, PTKSA replay counters field 408, GTKSA replay counters field 410 and peerkey enabled field 414 are described in an IEEE 802.11 standard, for example. The reserved fields 412, 416 and 420 may each be set to determined values.

In various embodiments of the invention, the protected SN field 418 may indicate whether the transmitting STA is capable of utilizing security methods for SN protection, in accordance with an embodiment of the invention. In an exemplary embodiment of the invention, the protected SN field 418 may comprise a single bit. A protected SN field 418 value of '1' in a transmitted management frame may indicate that the transmitting STA is capable of utilizing security methods for SN protection. A protected SN field value of '0' in a transmitted management frame may indicate that the transmitting STA is not capable of utilizing security methods for SN protection. In an exchange of management frames for RSNA, if both the source STA and the destination STA transmit management frames in which the protected SN field value is '1', then the source STA and destination STA may establish an RSNA utilizing security methods for SN protection, in accordance with an embodiment of the invention.

While FIG. 4, presents a modified RSN capabilities field 402 for use within an RSN IE, various embodiments of the invention are not so limited. For example, various embodiments of the invention may utilize a different field within the RSN IE, a new field within the RSN IE, or even a field in a different element, to enable security methods for SN protection.

Figure 5:
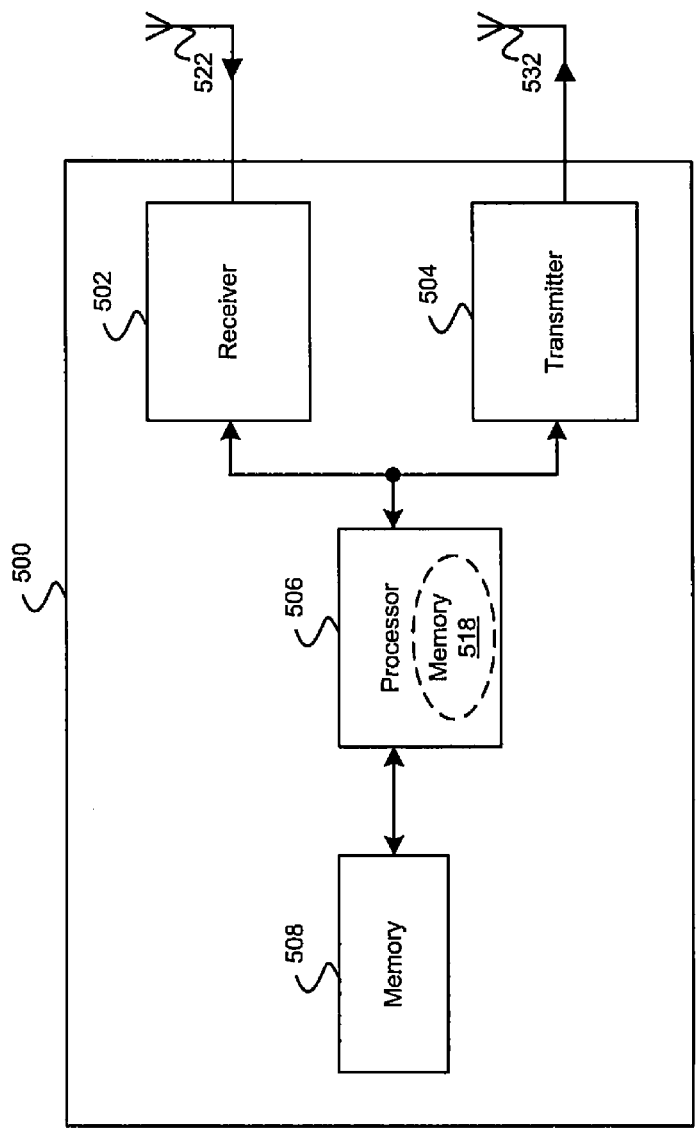
FIG. 5 is a diagram of an exemplary communicating device, which may be utilized in connection with an embodiment of the invention.

FIG. 5 is a diagram of an exemplary communicating device, which may be utilized in connection with an embodiment of the invention. Referring to FIG. 5, there is shown a transceiver system 500, a receiving antenna 522 and a transmitting antenna 532. The transceiver system 500 may be exemplary of the src_STA 102 and/or dest_STA 104. The transceiver system 500 may comprise at least a receiver 502, a transmitter 504, a processor 506, and a memory 508. The processor 506 may comprise a memory 518. Although a transceiver is shown in FIG. 5, transmit and receive functions may be separately implemented. In various embodiments of the invention, the transceiver system 500 may comprise a plurality of transmitting antennas and/or a plurality of receiving antennas. Various embodiments of the invention may comprise a single antenna, which is coupled to the transmitter 504 and receiver 502 via a transmit and receive switch.

The receiver 502 may comprise suitable logic, circuitry, interfaces and/or code that may be operable to perform receiver functions that may comprise PHY layer function for the reception or signals. These PHY layer functions may comprise, but are not limited to, the amplification of received RF signals, generation of frequency carrier signals corresponding to selected RF channels, for example uplink or downlink channels, the down-conversion of the amplified RF signals by the generated frequency carrier signals, demodulation of data contained in data symbols based on application of a selected demodulation type, and detection of data contained in the demodulated signals. The RF signals may be received via the receiving antenna 522. The data may be communicated to the processor 506.

The transmitter 504 may comprise suitable logic, circuitry, interfaces and/or code that may be operable to perform transmitter functions that may comprise PHY layer function for the transmission or signals. These PHY layer functions may comprise, but are not limited to, modulation of received data to generate data symbols based on application of a selected modulation type, generation of frequency carrier signals corresponding to selected RF channels, for example uplink or downlink channels, the up-conversion of the data symbols by the generated frequency carrier signals, and the generation and amplification of RF signals. The data may be received from the processor 506. The RF signals may be transmitted via the transmitting antenna 532.

The memory 508 may comprise suitable logic, circuitry, interfaces and/or code that may enable storage and/or retrieval of data and/or code. The memory 508 may utilize any of a plurality of storage medium technologies, such as volatile memory, for example random access memory (RAM), and/or non-volatile memory, for example electrically erasable programmable read only memory (EEPROM). In the context of the present application, the memory 508 may enable storage of code for generation of PN values, temporal keys and/or for encryption of data for SN protection. The memory 508 may also be utilized to store RX scorecard information and/or RX buffer information and/or TX scorecard information. The memory 508 may also be utilized to store other state information.

The memory 518 may comprise suitable logic, circuitry, interfaces and/or code that may enable storage and/or retrieval of data and/or code. The memory 518 may utilize any of a plurality of storage medium technologies, such as volatile memory, for example random access memory (RAM), and/or non-volatile memory, for example electrically erasable programmable read only memory (EEPROM). In the context of the present application, the memory 518 may enable storage of code for generation of PN values, temporal keys and/or for encryption of data for SN protection. The memory 518 may also be utilized to store RX scorecard information and/or RX buffer information and/or TX scorecard information. The memory 518 may also be utilized to store other state information.

The processor 506 may store code and/or data in the memory 508 and/or memory 518. The processor 506 may retrieve code and/or data from the memory 508 and/or memory 518. The processor 506 may utilize the memory 518 for internal storage of code and/or data. An exemplary form of internal memory is cache memory. The processor 506 may utilize the memory 508 for external storage of code and/or data. In the context of the present application, the memory 508 and memory 518 may be utilized interchangeably by the processor 506.

In operation, the processor 506 within a source STA may be operable to generate management frames, for example beacon frames, for RSNA. The processor 506 may generate beacon frames, which comprise an RSN IE. The RSN IE may comprise an RSN capabilities field 402. The processor 506 may indicate that the source STA is operable to utilize security methods for SN protection by setting a value within the protected SN field 418. The beacon frame may be sent to the transmitter 504. The transmitter 504 may generate a physical layer protocol data unit (PPDU) based on the beacon frame. The PPDU may be transmitted to the destination STA by the transmitter 504 via a transmitting antenna 532.

The receiver 502 may be operable to receive a transmitted PPDU via the receiving antenna 522. The received PPDU may comprise a physical layer service data unit (PSDU), which comprises an MPDU. The receiver 502 may send the MPDU to the processor 506. The processor 506 may be operable to determine that the MPDU comprises a management frame, for example an association request frame, which was transmitted by the destination STA. The processor 506 may determine that the received management frame comprises an RSN IE. The RSN IE may comprise an RSN capabilities field. The RSN capabilities field may comprise a protected SN field 418, which indicates that the destination STA is operable to utilize security methods for SN protection. The processor 506 at the source STA may generate and receive subsequent management frames to establish an RSNA with the destination STA.

The operation of the processor 506 at the destination STA is substantially similar to the operation described above. For example, the processor 506 at a destination STA may be operable to determine receipt of a beacon frame from the source STA. The processor 506 may generate, for example, an association frame, which indicates that the destination STA is operable to utilize security procedures for SN protection, in accordance with an embodiment of the invention.

Once the RSNA has been established for SN protection, the source STA and destination STA may negotiate a block ACK agreement based on the exchange of management frames, as described above. A flow, subject to the block ACK agreement may be identified based on an (SA,DA,TID) tuple. The processor 506 at a destination STA may receive one or more data frames associated with the flow. For each received data frame, the processor 506 may decrypt the encrypted frame body in the received data frame based on the encrypted frame body, the temporal key, the generated MD and a generated nonce. The processor 506 at the destination STA may generate the nonce based on the SN value in the received data frame. In various embodiments of the invention, if the received data frame comprises a forged SN value, integrity checking of the MIC value at the destination STA may fail. In an exemplary embodiment of the invention, the processor 506 may compute an integrity check value based on at least a portion of the decrypted received data frame. The computed integrity check value may be compared with the MIC field 210 within the received data frame. Based on the comparison, processor 506 may determine whether the integrity check has been successful or whether the integrity check has failed. In instances when the MIC integrity check fails, the processor 506 may discard the received data frame. However, upon determining that the MIC integrity check has failed, the processor 506 may not adjust RX scorecard values and/or RX buffer values for the discarded data frame and/or other state information stored at the destination STA. If the received data frame does not comprise a forged SN value, the integrity checking of the MIC may not fail. In instances when the MIC integrity check does not fail, the destination STA may accept the plaintext version of the payload portion of the received data frame. The plaintext version of the payload data 208 may be stored in a receive buffer pending delivery to a higher layer protocol entity. Accordingly, one or more RX scorecard and/or RX buffer values and/or other state information stored at the destination STA may be adjusted.

The methods described herein may also be utilized in connection with WPA security methods. Various embodiments of the invention are not limited to sequence number protection with block acknowledgment. Various embodiments of the invention may be practiced with single frame transmission and acknowledgement and/or with other non-block ACK communications, for example. The operation of a method and system for secure acknowledgment with sequence number protection is substantially similar to the method and system described for the method and system for secure block acknowledgment with sequence number detection as is described above. For example, in an exemplary method and system for secure acknowledgment with sequence number protection, the destination STA may perform an MIC integrity check on receive data frames, substantially as described above. Based on the MIC integrity check result, the destination STA may accept the received data frame and modify state information, such as a replay counter for example, when the MIC integrity check result indicates success. Alternatively, in instances in which the MIC integrity check result indicates failure, the destination STA may discard the received data frame and not modify state information, such as a replay counter for example.

In various exemplary embodiments of the invention, a destination STA may receive data frames with SN protection in instances in which the data frames are received in connection with a block acknowledgment agreement between the source STA and the destination STA while in other exemplary embodiments of the invention, a destination STA may receive data frames with SN protection in instances in which the data frames are received in the absence of a block acknowledgment agreement between the source STA and the destination STA.

Figure 6:
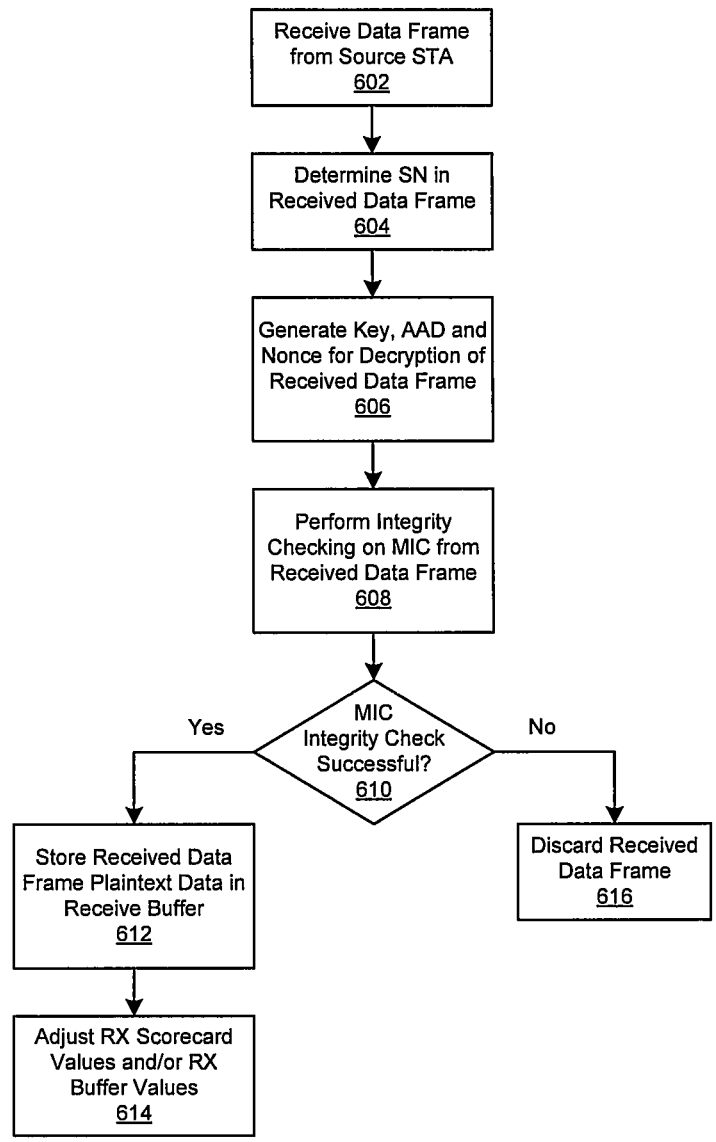
FIG. 6 is a flowchart that illustrates exemplary steps for sequence number protection, in accordance with an embodiment of the invention.

FIG. 6 is a flowchart that illustrates exemplary steps for sequence number protection, in accordance with an embodiment of the invention. Referring to FIG. 6, in step 602, a destination STA may receive a data frame from a source STA. The frame body of the received data frame may be protected utilizing various security methods, in accordance with an embodiment of the invention. In step 604, the destination STA may determine the SN value in the received data frame. In step 606, the destination STA may generate a temporal key, MD, and nonce for decryption of the protected frame body. The nonce may be generated based on the SN value determined in step 604. In step 608, the destination STA may perform integrity checking based on the MIC field in the received data frame. Step 610 may determine whether the MIC integrity check was successful. In instances in which the MIC integrity check at step 610 was successful, in step 612, the plaintext data from the received data frame may be buffered within a receive buffer at the destination STA. In step 614, one or more RX scorecard values and/or RX buffer values and/or other state information may be adjusted based on the received data frame. For example, the destination STA may update an RX scorecard value and/or a replay counter to indicate that a data frame with the SN value determined in step 604 has been successfully received. In instances in which the MIC integrity check at step 610 was not successful, in step 616, the destination STA may discard the received data frame.

Figure 7:
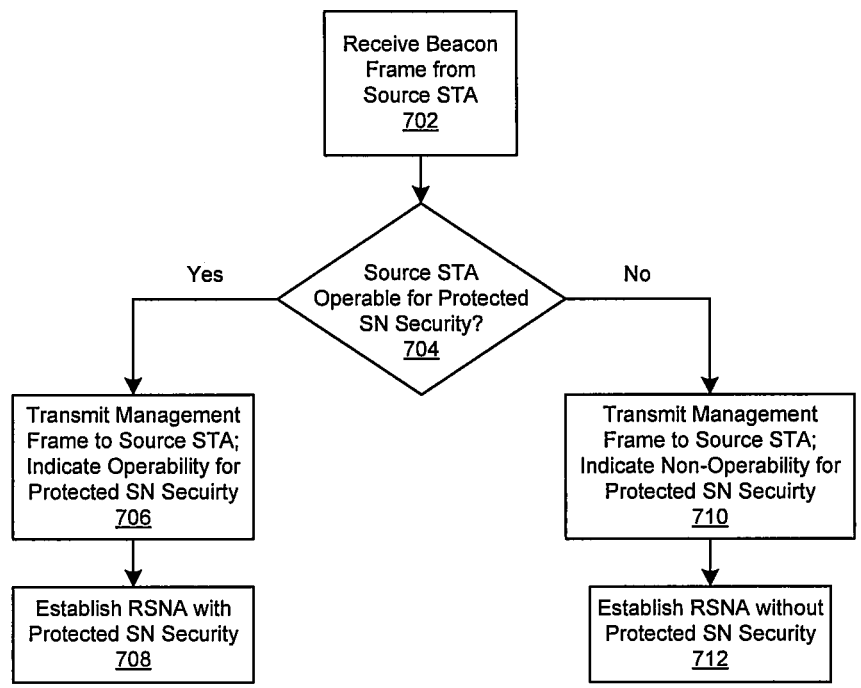
FIG. 7 is a flowchart that illustrates exemplary steps for robust security network association for sequence number protection, in accordance with an embodiment of the invention.

FIG. 7 is a flowchart that illustrates exemplary steps for robust security network association for sequence number protection, in accordance with an embodiment of the invention. Referring to FIG. 7, in step 702, a destination STA may receive a beacon frame from a source STA. In an exemplary embodiment of the invention, the source STA may comprise an access point (AP) in a wireless local area network (WLAN) within a basic service set (BSS). In step 704, the destination STA may determine whether the beacon frame comprises a protected SN field 418, which indicates that the source STA that transmitted the beacon frame is operable to utilize security methods for SN protection. In instances in which the protected SN field 418 within the received beacon frame indicates that the source STA is operable to utilize security methods for SN protection, in step 706, the destination STA may transmit a management frame, for example an association request frame, to the source STA. The association request frame may comprise a protected SN field 418, which indicates that the destination STA is operable to utilize security methods for SN protection. In step 708, the source STA and the destination STA may engage in subsequent management frame exchanges to establish an RSNA, which utilizes security methods for SN protection.

In instances in which the protected SN field 418 within the received beacon frame indicates that the source STA is not operable to utilize security methods for SN protection, in step 710, the destination STA may transmit a management frame to the source STA. The transmitted management frame may comprise a protected SN field 418, which indicates that the destination STA is not operable to utilize security methods for SN protection. In step 712, the source STA and the destination STA may engage in subsequent management frame exchanges to establish an RSNA, which does not utilize SN protection.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for protected MAC sequence number, and for secure block acknowledgment (block ACK) with protected MAC sequence number.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a communication network, the method comprising:
    performing using at least one processor, functions comprising:
        receiving a medium access control (MAC) protocol data unit from a sequence comprising plurality of MAC protocol data units;
        determining a sequence number value for said received MAC protocol data unit that indicates a position of said received MAC protocol data unit in said sequence;
        generating a nonce from said sequence number value, said nonce being unique to said sequence number value;
        decrypting a service data unit portion of said received MAC protocol data unit based on said nonce;
        computing an integrity check value based on said decrypted service data unit portion;
        determining a determined integrity check value based on based on a message integrity check field of said decrypted service data unit portion;
        comparing said computed integrity check value and said determined integrity check value;
        generating adjusted state information for MAC protocol data unit reception based on said decrypting; and
        storing said adjusted state information in a memory.

2. The method according to claim 1, comprising generating a nonce value based on a packet number value, a destination address and a priority field value, the packet number value including said sequence number value, a middle bits value and a traffic identifier value.

3. The method according to claim 2, comprising decrypting said service data unit portion of said received MAC protocol data unit based on said generated nonce value.

4. The method according to claim 1, comprising generating said adjusted state information based on said comparing.

5. The method according to claim 4, wherein said adjusted state information comprises one or more of receiver scorecard values, receiver buffer values, and replay counters.

6. The method according to claim 1, comprising performing an integrity check of said received MAC protocol data unit based on said decrypted message integrity check (MIC) field, said performing including said computing said integrity check value based on said decrypted service data unit portion, said determining said determined integrity check value based on said decrypted MIC and said comparing said computed integrity check value and said determined integrity check value.

7. The method according to claim 6, comprising storing decrypted payload data of said decrypted service data unit portion in said memory when said integrity check is successful.

8. The method according to claim 7, comprising storing said decrypted payload data subsequent to said generating of said adjusted stated information.

9. A system for communicating information in a communication network, the system comprising:
    one or more circuits that are operable to receive a medium access control (MAC) protocol data unit from a sequence comprising a plurality of MAC protocol data units;
    said one or more circuits are operable to determine a sequence number value for said received protocol data unit that indicates a position of said received MAC protocol data unit in said sequence;
    said one or more circuits are operable to generate a nonce from said sequence number value, said nonce being unique to said sequence number value;
    said one or more circuits are operable to decrypt a service data unit portion of said received MAC protocol data unit based on said nonce;
    said one or more circuits are operable to compute an integrity check value based on said decrypted service data unit portion;
    said one or more circuits are operable to determine a determined integrity check value based on a message integrity check field of said decrypted service data unit portion;
    said one or more circuits are operable to compare said computed integrity check value and said determined integrity check value;
    said one or more circuits are operable to generate adjusted state information for MAC protocol data unit reception based on said decrypting; and
    said one or more circuits are operable to store said adjusted state information in a memory.

10. The system according to claim 9, wherein said one or more circuits are operable to generate said nonce value based on a packet number value, a destination address and a priority field value, the packet number value including said sequence number value, a middle bits value and a traffic identifier value.

11. The system according to claim 10, wherein said one or more circuits are operable to decrypt said service data unit portion of said received MAC protocol data unit based on said generated nonce value.

12. The system according to claim 9, wherein said one or more circuits are operable to generate said adjusted state information based on said comparing.

13. The system according to claim 12, wherein said one or more circuits are operable to store decrypted data from said received protocol data unit subsequent to said generating of said adjusted stated information.

14. The system according to claim 12, wherein said adjusted state information comprises one or more of receiver scorecard values, receiver buffer values, and replay counters.

15. A system for communicating information, the system comprising:
   one or more circuits for use in a wireless station, said one or more circuits being operable to:
      receive a medium access control (MAC) protocol data unit from a sequence comprising a plurality of MAC protocol data units;
      determine a sequence number for said received MAC protocol data unit that indicates a position of said received MAC protocol data unit in said sequence;
      generate a nonce from said sequence number value, said nonce being unique to said sequence number value;
      decrypt a service data unit portion of said received MAC protocol data unit that comprises payload data and a message integrity code (MIC), said decryption being based on said nonce;
      perform an integrity check of said received MAC protocol data unit based on said decrypted MIC by computing an integrity check value based on said decrypted service data unit portion, determining a determined integrity check value based on the decrypted MIC and comparing said computed integrity check value and said determined integrity check value; and
      store said decrypted payload data when said integrity check is successful.

16. The system according to claim 15, wherein said one or more circuits are operable to generate a nonce value based on a packet number value, a destination address and a priority field value, the packet number value including said sequence number value, a middle bits value and a traffic identifier value.

17. The system according to claim 16, wherein said one or more circuits are operable to decrypt said service data unit portion of said received MAC protocol data unit based on said generated nonce value.

18. The system according to claim 15, wherein said one or more circuits are operable to generate adjusted state information based on said comparing.

19. The system according to claim 18, wherein said one or more circuits are operable to store said decrypted payload data subsequent to said generating of said adjusted stated information.

20. The system according to claim 18, wherein said adjusted state information comprises one or more of receiver scorecard values, receiver buffer values, and replay counters.

* * * * *

UNITED STATES PATENT AND TRADEMARK OFFICE
CERTIFICATE OF CORRECTION

PATENT NO.          : 8,473,732 B2                                               Page 1 of 1
APPLICATION NO.     : 12/405354
DATED               : June 25, 2013
INVENTOR(S)         : Henry Ptasinski et al.

It is certified that error appears in the above-identified patent and that said Letters Patent is hereby corrected as shown below:

In the Claims:

Col. 13, line 63, in Claim 1: after "integrity check value" delete "based on"

Signed and Sealed this
Twenty-ninth Day of April, 2014

Michelle K. Lee
*Deputy Director of the United States Patent and Trademark Office*